Inventor
JOSEPH HILSENRATH
SAMUEL GLOBE

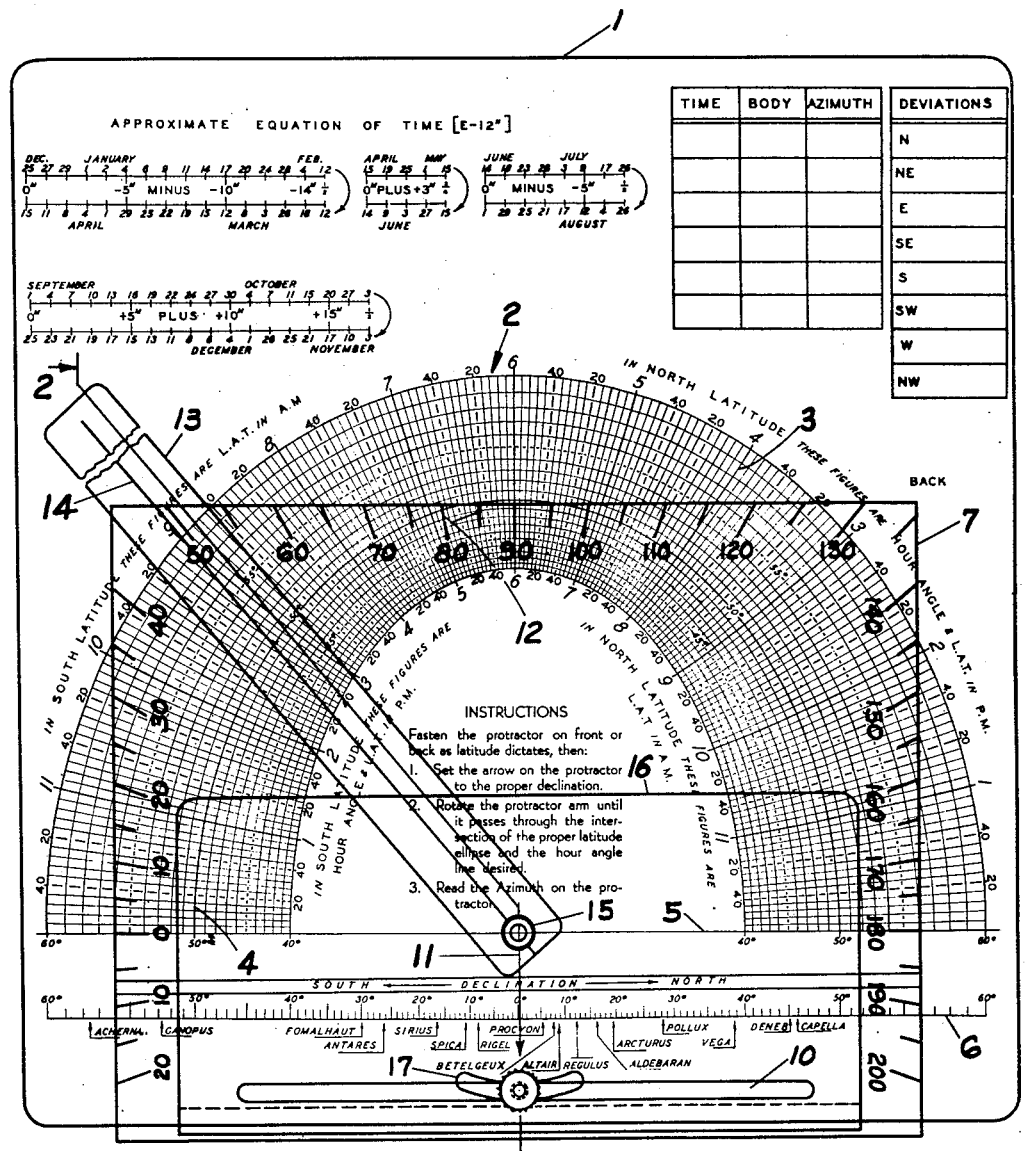

Patented June 26, 1951

2,557,965

UNITED STATES PATENT OFFICE 2,557,965

AZIMUTH COMPUTER

Joseph Hilsenrath, Takoma Park, Md., and Samuel Globe, Washington, D. C.

Original application March 20, 1945, Serial No. 583,823. Divided and this application September 19, 1946, Serial No. 697,842

6 Claims. (Cl. 33—1)

(Granted under the act of March 3, 1883, as amended April 30, 1928; 370 O. G. 757)

This application is a division of application Serial No. 583,823, filed March 20, 1945, now Patent No. 2,408,776, granted October 8, 1946.

This invention relates generally to navigation instruments, and particularly to devices for solving spherical triangles.

In the art of navigation it is a constantly recurring problem to solve spherical triangles for one angle when others are known. Compass adjusters must frequently determine azimuth of some celestial body for purpose of checking the indication of the compass under observation.

It is common practice in such cases to start with such factors as hour angle, latitude of the observer and declination of the observed body, and determine its azimuth by reference to various tables, charts, etc. A compass adjuster will often have a number of azimuth cards or curves calculated for certain locations.

In these various determinations of azimuth, interpolations are often necessary, and the calculations are such that an error early in the process may be multiplied as the calculation proceeds, leading to errors of intolerable magnitude.

At best the calculations are tedious and time consuming. There is a need for some means for determining azimuths rapidly and with a minimum chance for errors such as are common in the ordinary methods used.

It is, therefore, an object of the invention to provide a simple and practical device capable of facile and rapid determinations of azimuth, when local apparent time or hour angle, latitude and declination are known.

It is an object to provide a device sufficient in itself for accurate solution of spherical triangles, avoiding any need for reference to bulky volumes of azimuth tables, etc.

A further object of our invention is to provide an azimuth computer which will give either true or magnetic azimuths.

In the drawings:

Figure 1 is a representation of a form of this invention, with the protractor mounted thereon for magnetic or true azimuths.

Figure 2 is a sectional view on line 2—2 of Figure 1, and

Figure 3:
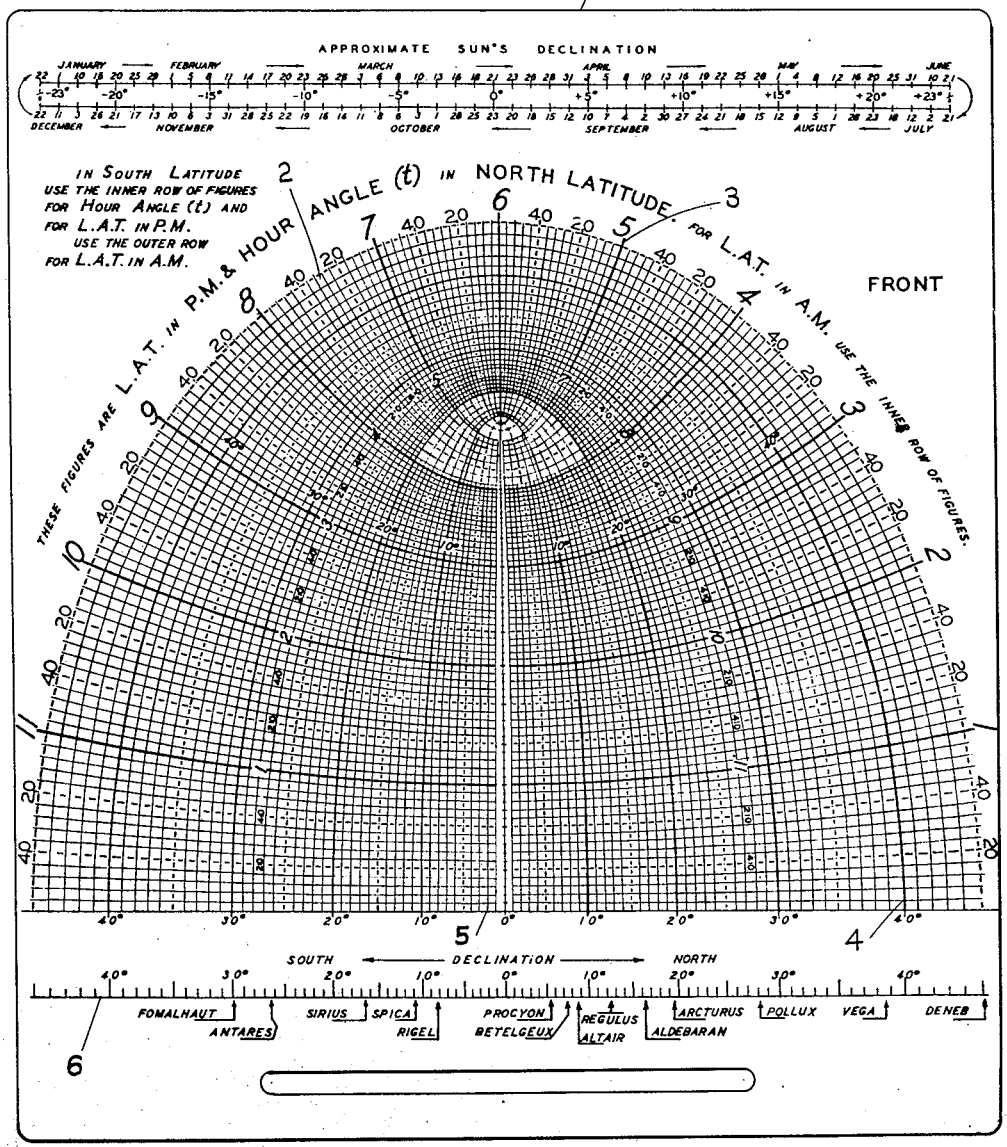

Figure 3 indicates the back side of the base of the computer.

As indicated in Figure 1, our azimuth computer includes an opaque base 1 on which is printed or otherwise suitably marked a grid 2. The grid is composed of hour angle hyperbolas 3 and latitude ellipses 4 in suitable increments. The line 5, which we term the axis of the grid, is an axis of the confocal hyperbolas and ellipses, and is parallel to the lower edge of the base 1.

Hyperbolas 3 are numbered inside and outside the grid. Latitude ellipses 4 are numbered along the axis 5. Since the latitude ellipses also serve to measure declination, the indications along axis 5 are brought down and repeated at scale 6 for convenience in operation.

The difference in the grids on front and back of the base is only in the scope of latitudes covered. On the back are marked ellipses for latitudes of from 40° to 60°, while latitudes of 0° to 45° are marked on the front side. Front and back grids will be registered so that the protractor may be used on either side.

Mounted for sliding parallel to the axis 5 is a sliding member 16 of transparent material. The lower edge of the sliding member 16 is bent around the lower edge of the base 1 to assist in holding the sliding member in proper relation to the base 1. Pivoted to the sliding member 16 is a protractor 7, also of transparent material, and also pivoted on this same pivot 15 is a protractor arm 13. The scale of the protractor 7 is indicated at 12. A bolt 8 with a nut 9 fits through a hole in sliding member 16 and through an arcuate slot 17 in the protractor 7, the arcuate slot 17 being centered on the pivot 15. The bolt 8 extends through and may slide in a slot 10 cut through base 1 parallel to the axis 5 and to the bottom edge of the base.

Protractor arm 13 with its index line 14 is pivoted at 15 to the sliding member 16 in such fashion that pivot 15 lies directly over axis 5 when sliding member 16 is mounted on the base 1. A line 11 is marked on sliding member 16 projecting downwardly from the pivot point 15 for reading against the line 6. Graduations of the protractor 7 are continued beyond 0° and 180° on each end of the scale to 20° and 200° as shown. The protractor 7 may be set to the magnetic variation by reading its scale 12 against the line 5, and secured by tightening the nut 9. If true azimuth is desired, the protractor is secured at the position of zero variation.

It will be apparent that the sliding member 16 and protractor 7 may be slid along the base with pivot 15 following axis 5 and that declination may be read by consideration of line 11 relative to scale 6. Position of index line 14 will be read on suitable scales on the outer edges of the protractor. In order that the device may be used for north and south latitudes and for any hour angle or local apparent time, the various scales will be suitably numbered and full directions marked explaining operation. Not all the markings employed are shown to avoid confusing detail.

The theory of the device is as follows:

In the grid 2, latitude ellipses $l$ are defined by the equation $$\frac{x^2}{\sec^2 l}+\frac{y^2}{\tan^2 l}=1$$

Hour angle hyperbolas $h$ are defined by the equation $$\frac{x^2}{\sin^2 h}-\frac{y^2}{\cos^2 h}=1$$

Systems of latitude ellipses and hour angle hyperbolas are marked on $x$ and $y$ coordinate axes. The intersection of a latitude ellipse with an hour angle hyperbola defines a point A whose coordinates are:

$x = \sec l \sin h$
$y = \tan l \cos h$

If from a point B on the $y$ axis with coordinates $x=0$
$y=\tan d$, where $d=$declination, a line AB be drawn, such line will form with the $y$ axis an angle $a$ which represents the azimuth of a body of declination $d$ from latitude $l$ at hour angle $h$.

The device described has been designed to solve this system mechanically. In the grid 2 the line 5 corresponds to the $y$ coordinate axis.

In operation, to determine azimuth of a given body, with declination, hour angle, and latitude known, the first step is to mount the protractor on front or back of the base 1, as dictated by latitude. The protractor 7, set at the desired magnetic variation, and the sliding member 16, will then be secured by tightening nut 9 in such position that line 11 crosses scale 6 at the proper declination. Arm 13 will then be moved to locate line 14 at the intersection of the ellipse and hyperbola representing the known latitude and hour angle. Line 14 will then indicate on the scale of the protractor the azimuth, commonly referred to as Zn.

In Figure 1, the instrument is set to determine true azimuth or zero magnetic variation when:

Latitude=40° S.
Declination=0°
Hour angle=2$^h$ 26$^m$ E.

azimuth reads on the protractor 7 as 48.7°.

If a magnetic variation answer were desired, say 5° west variation for instance, then protractor 7 would be pivoted counterclockwise about its slot 17 until the 5° W. marking on scale 12 is set on the axis 5 before the nut 9 is tightened on the protractor 7 and the sliding member 16. With the same problem set as above, in such case the azimuth would of course read as 53.7°.

As is apparent, the entire problem is solved by the one instrument. There is no need for reference to any books or charts. To facilitate this operation, directions and rules may be printed on the device. Some are shown, others omitted for clarity of illustration. The computer may be used for any latitude or declination to 60° either north or south. Azimuth is found directly as Zn.

Obviously many changes are permissible while adhering to the principles of the invention as expressed in the following claims.

The invention described herein may be manufactured and used by or for the Government of the United States of America for governmental purposes without the payment of any royalties thereon or therefor.

What is claimed is:

1. In an azimuth computer, a base member comprising a grid composed of confocal hour angle hyperbolas and latitude ellipses, said base member having a plurality of bearing surfaces parallel to the minor axis of the ellipses, a sliding member mounted on the base member, said sliding member having means cooperating with and engaging said bearing surfaces, whereby said sliding member is slidably but non-rotatably movable parallel to said minor axis, a protractor pivoted on said sliding member, at a point coinciding with said minor axis whereby the pivot may move along said minor axis, pin and slot means offset from said point limiting the rotation of said protractor relative to said sliding member, and an arm pivoted on said protractor at the same pivot point.

2. In an azimuth computer, a base member comprising a grid composed of confocal hour angle hyperbolas and latitude ellipses, said base member having a plurality of bearing surfaces parallel to the minor axis of the ellipses, a sliding member mounted on the base member, said sliding member having means cooperating with and engaging said bearing surfaces, whereby said sliding member is slidably but non-rotatably movable parallel to said minor axis, a protractor, pivot means pivotally mounting said protractor on said sliding member at a point coinciding with said minor axis whereby the pivot axis may move along said minor axis, a protractor arm pivoted to said protractor at said same pivot point, and means limiting the rotation of said protractor relative to said sliding member, comprising an arcuate slot through said protractor and having its center at the axis of said pivot means, and a bearing pin passing through said slot and said base and sliding members and including a clamping device for securing the members and protractor in adjusted relationship.

3. In an azimuth computer, a reversible base member comprising a grid composed of confocal hour angle hyperbolas and latitude ellipses, terminating at the minor axis of the ellipses, the grid on one side of said base member being a continuation of and registered with the grid on the other side thereof, said base member having a plurality of bearing surfaces parallel to the minor axis of the ellipses, a sliding member mounted on the base member, said sliding member having means cooperating with and engaging said bearing surfaces, whereby said sliding member is slidably but non-rotatably movable parallel to said minor axis, said bearing surfaces and said cooperating and engaging means including an edge on one of said members parallel to said minor axis and a lip on the other of said members bearing against and engaging with said edge, a protractor pivotally mounted upon said base member with its center upon the minor axis of said ellipses, a circular slot in said protractor having the same center as said protractor, a pin passing through said sliding member and said arcuate slot and a cooperating nut to secure said protractor and base member in adjusted relationship, and a protractor arm pivoted to said protractor for movement about its center, whereby said sliding member, protractor and arm may be secured on either side of said base member for cooperation with either grid.

4. In an azimuth computer, a base member comprising a grid composed of confocal hour angle hyperbolas and latitude ellipses, said base member having a plurality of bearing surfaces parallel to the minor axis of the ellipses, a sliding member mounted on the base member, said sliding member having means cooperating with and engaging said bearing surfaces, whereby said sliding member is slidably but non-rotatably movable parallel to said minor axis, a protractor pivoted on said sliding member, at a point coinciding with said minor axis whereby the pivot may move along said minor axis, means limiting the rotation of said protractor relative to said sliding member, and an arm pivoted on said protractor at the same pivot point, said bearing surfaces and said cooperating and engaging means including an edge on one of said members parallel to said minor axis and a lip on the other of said members bearing against and engaging with said edge, and a slot in at least one of said members and a threaded bearing pin and locking nut in the other of said members and in said slot, the declination axis being duplicated below the minor axis, an indicator means on said sliding member reading on said duplicate declination axis, an indicator means on said protractor arm comprising a line extending from the pivot, said protractor being offset between said duplicate declination axis and said minor axis, said protractor arm being pivoted to the bottom of said protractor between said protractor and said sliding member.

5. In an azimuth computer, a base member comprising a grid composed of confocal hour angle hyperbolas and latitude ellipses, said base member having a plurality of bearing surfaces parallel to the minor axis of the ellipses, a sliding member mounted on the base member, said sliding member having means cooperating with and engaging said bearing surfaces, whereby said sliding member is slidably but non-rotatably movable parallel to said minor axis, a protractor pivoted on said sliding member, at a point coinciding with said minor axis whereby the pivot may move along said minor axis, means limiting the rotation of said protractor relative to said sliding member, and an arm pivoted on said protractor at the same pivot point, the declination axis being duplicated below the minor axis, an indicator means on said sliding member reading on said duplicate declination axis, an indicator means on said protractor arm comprising a line extending from the pivot, said protractor being offset between said duplicate declination axis and said minor axis, said protractor arm being pivoted to the bottom of said protractor between said protractor and said sliding member.

6. In an azimuth computer, a base member comprising a grid composed of confocal hour angle hyperbolas and latitude ellipses; a protractor in juxtaposed relation to said base member, said base member having a plurality of bearing surfaces parallel to the minor axis of the ellipses and having a straight slot in spaced parallelism with said minor axis; a sliding member mounted on the base member and having means cooperating with and engaging said bearing surfaces, whereby said sliding member is slidably but non-rotatably movable parallel to said minor axis; a protractor pivotally mounted upon said sliding member about an axis upon the minor axis of said ellipses; a circular slot in said protractor tangent to the straight slot in said base member and having its center at the protractor axis of rotation; a pin passing through said sliding member, said straight slot, and said arcuate slot; a nut cooperating with said pin to secure said protractor, sliding member and base member in adjusted relationship; and a protractor arm pivoted to said protractor at the axis of rotation of said protractor upon said sliding member, whereby said sliding member, protractor and arm may be secured on either side of said base member for cooperation with either grid.

JOSEPH HILSENRATH.
SAMUEL GLOBE.

REFERENCES CITED

The following references are of record in the file of this patent:

UNITED STATES PATENTS

| Number | Name | Date |
|---|---|---|
| 13,560 | Abbott | Sept. 11, 1865 |
| 2,408,776 | Hilsenrath et al. | Oct. 8, 1946 |
| 2,441,636 | Kaufman et al. | May 18, 1948 |

FOREIGN PATENTS

| Number | Country | Date |
|---|---|---|
| 537,924 | Great Britain | July 14, 1941 |
| 557,901 | Great Britain | Dec. 9, 1943 |